(12) United States Patent
Baughman et al.

(10) Patent No.: US 11,455,486 B2
(45) Date of Patent: Sep. 27, 2022

(54) COHORT EXPERIENCE ORCHESTRATOR

(71) Applicant: International Business Machines Corporation, Armonk, NY (US)

(72) Inventors: Aaron K. Baughman, Cary, NC (US); Hernan A. Cunico, Holly Springs, NC (US); Martin G. Keen, Cary, NC (US); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 17/118,929

(22) Filed: Dec. 11, 2020

(65) Prior Publication Data
US 2022/0188563 A1 Jun. 16, 2022

(51) Int. Cl.
*G06T 19/00* (2011.01)
*G06K 9/62* (2022.01)
*G06F 16/9035* (2019.01)

(52) U.S. Cl.
CPC ....... *G06K 9/6219* (2013.01); *G06F 16/9035* (2019.01); *G06T 19/006* (2013.01)

(58) Field of Classification Search
CPC .............. G06K 9/6219; G06F 16/9035; G06F 16/24578; G06T 19/006
See application file for complete search history.

(56) References Cited

U.S. PATENT DOCUMENTS

| 8,965,822 B2 | 2/2015 | Frank et al. |
| 10,262,261 B2 | 4/2019 | Sanchez et al. |
| 11,269,891 B2 * | 3/2022 | Frank ................ G06F 16/24578 |
| 2016/0188585 A1 * | 6/2016 | Durham ............. H04L 12/1827 345/633 |
| 2017/0171690 A1 | 6/2017 | Kim et al. |
| 2019/0306661 A1 | 10/2019 | Deluca et al. |
| 2020/0008171 A1 | 1/2020 | Jagannathan et al. |
| 2021/0073712 A1 * | 3/2021 | Fox ................ G06Q 10/063114 |

FOREIGN PATENT DOCUMENTS

WO    2019075132 A1    4/2019

OTHER PUBLICATIONS

List of all IBM related dockets, 2020.

* cited by examiner

*Primary Examiner* — Haoshian Shih
(74) *Attorney, Agent, or Firm* — Garg Law Firm, PLLC; Rakesh Garg; Michael O'Keefe

(57) ABSTRACT

An embodiment includes determining an experiential state of a first user participating in a mixed-reality experience. The embodiment also includes creating a first driver model that maps a relationship between the experiential state of the first user and a parameter of the mixed-reality experience. The embodiment also includes aggregating the first driver model with a plurality of driver models associated with experiential states and parameters of respective other users. The embodiment also includes creating a first cohort experience model using the aggregated driver models. The embodiment also includes deriving a first cohort experience parameter for the first cohort experience model. The embodiment also includes initiating an automated remedial action for participants in the mixed-reality system being associated with the first cohort experience model and the first cohort experience parameter.

20 Claims, 6 Drawing Sheets

COHORT EXPERIENCE ORCHESTRATOR

BACKGROUND

The present invention relates generally to a method, system, and computerized encounters and entertainment, including amusement rides. More particularly, the present invention relates to a method, system, and computer program product for orchestration of cohort experiences.

Various amusement rides have been created to provide passengers with unique motion and visual experiences. In one example, roller coasters and theme rides can be implemented with multi-passenger vehicles that travel along a fixed path. In addition to the excitement created by the speed or change in direction of the vehicles as they move along the path, the vehicles themselves may generate special effects, e.g., sound and/or motion effects. Although a repeat rider may be familiar with the general path of the ride, the special effects may create interest during second and subsequent rides. In another example, certain rides may be implemented with projection elements to create varying scenery and movement as the passenger vehicles travel along the path.

SUMMARY

The illustrative embodiments provide for automated identification of changed-induced incidents. An embodiment includes determining an experiential state of a first user participating in a mixed-reality experience. The embodiment also includes creating a first driver model that maps a relationship between the experiential state of the first user and a parameter of the mixed-reality experience. The embodiment also includes aggregating the first driver model with a plurality of driver models associated with experiential states and parameters of respective other users. The embodiment also includes creating a first cohort experience model using the aggregated driver models. The embodiment also includes deriving a first cohort experience parameter for the first cohort experience model. The embodiment also includes initiating an automated remedial action for participants in the mixed-reality system being associated with the first cohort experience model and the first cohort experience parameter. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
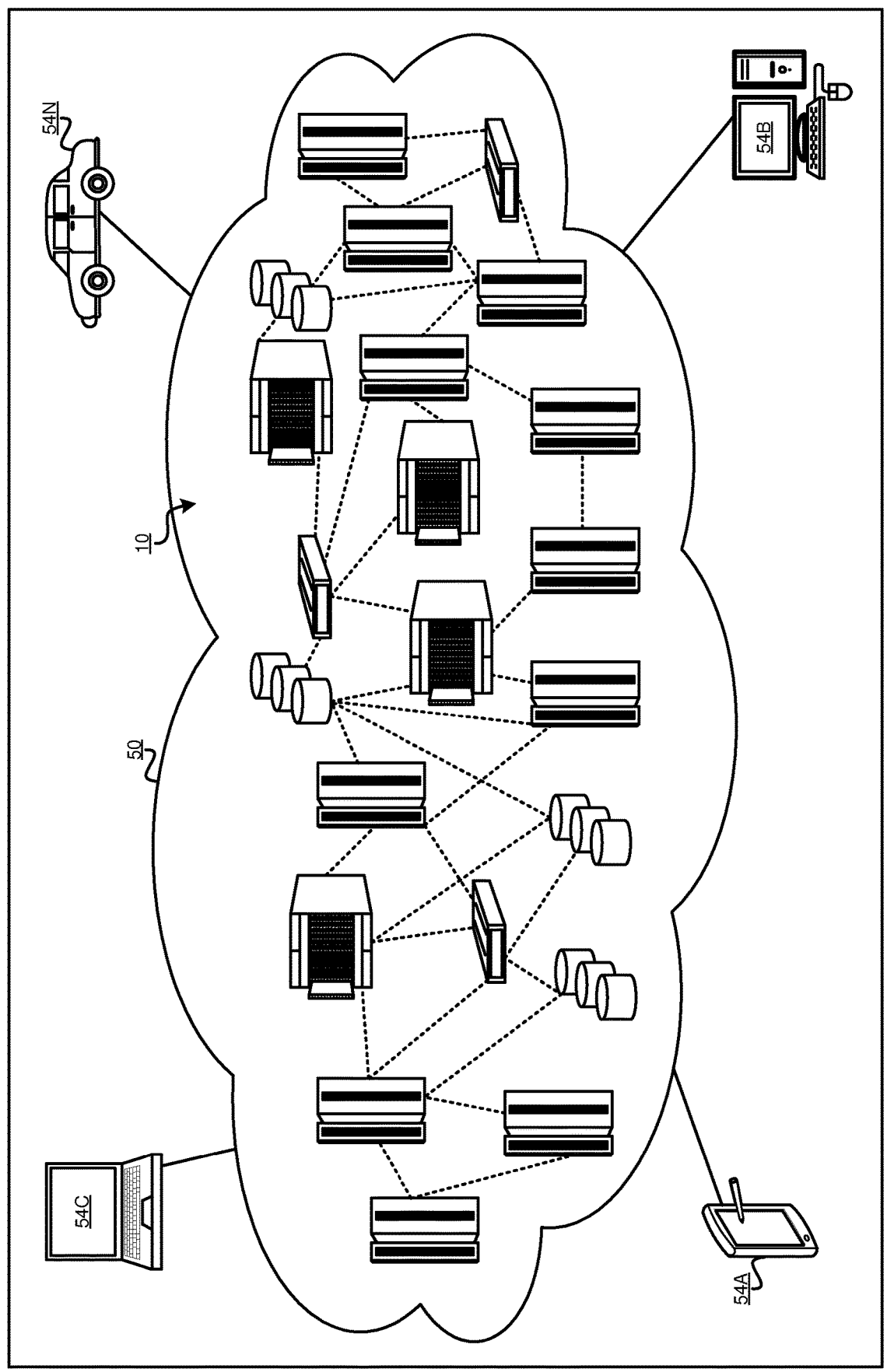
FIG. 1 depicts a cloud computing environment according to an embodiment of the present invention.

Recently, enhancements to passenger vehicle rides have been aimed at creating a more immersive entertainment experience for passengers. This has led to the adoption of new extended reality (XR) technologies for amusement rides. XR technology generally refers to all real-and-virtual combined environments and human-machine interactions generated by computer technology and wearables, where the 'X' represents a variable for any spatial computing technologies. For example, it includes representative forms such as augmented reality (AR), mixed-reality (MR) and virtual reality (VR) and the areas interpolated among them. The levels of virtuality range from partially sensory inputs to immersive virtuality, also called VR.—such as virtual reality (VR) and augmented reality (AR) technologies—for amusement rides. These technologies are designed to allow riders to be less aware of being within the confines of an amusement ride vehicle, and more fully immersed in the ride experience.

A head mounted display (HMD) is an example of new display technology being integrated with amusement rides. HMDs introduce a display device worn on or about a rider's head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image (CGI) while blocking the user's external view. These HMD displays are often referred to as virtual reality (VR) displays. Other HMDs are capable of superimposing CGI over a real-world view. This latter type of HMD can serve as the hardware platform for realizing augmented reality (AR). With AR the viewer's image of the world is augmented with an overlaying CGI. Another term used to refer to various types of HMDs is a heads-up display (HUD). A HUD is any display that permits the user to view a CGI without having to look down or otherwise take their eyes significantly off their head up forward position. Both VR and AR HMDs can be implemented as HUDs.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to mixed-reality. The following described exemplary embodiments provide a system, method, and program product to, among other things, analyze the current state of users participating in a mixed-reality (MR) experience, derive user preferences from previous experiences, predict what parameters of the MR experience could be altered to improve the user's experience, and aggregate the user's optimal parameters with those of other users to identify cohorts and associated parameters using the aggregated modeling and analysis results. Therefore, the present embodiment has the capacity to improve the technical field of mixed-reality by accurately identifying and executing dynamic and micro-based adjustments to crucial attributes of groups of users to arrive a single adjustments tailored to respective groups. each; this in turn has the potential to take MR entertainment experiences to a level of customization and user enjoyment previously unattainable by traditional rides and entertainment systems.

As previously described, mixed-reality is a field concerned with merging real and virtual worlds such that physical and digital objects co-exist and interact in real time. Mixed-reality does not exclusively take place in either the physical or virtual worlds, but is a hybrid of reality and virtual reality; as such, mixed-reality describes everything in the reality-virtuality continuum except for the two extremes, namely purely physical environments and purely virtual environments. Accordingly, mixed-reality includes augmented virtuality (AV), augmented reality (AR) and virtual reality (VR). Mixed-reality has found practical applications in remote working, military and commercial training, games, and hybrid amusement-park-style rides.

Entertainment industry mainstays such as Universal Studios® (Universal Studios® and all Universal Studios®-based trademarks and logos are trademarks or registered trademarks of Universal Studios, Inc. and/or its affiliates) and Disney® (Disney® and all Disney®-based trademarks and logos are trademarks or registered trademarks of Disney Enterprises, Inc. and/or its affiliates) have been increasingly moving into VR and AR space to create mixed-reality experiences that are new and distinct from the more traditional "physical" rides. With limited on-the-fly customization of options, traditional rides offer very little variation from one instance to the next. Some rides attempt to introduce variation by randomizing several variables within a limited range; for example, Hollywood Tower Hotel ride in Disney Studios utilizes a randomizer system that controls which chute the elevator car is going to drop from, the duration and acceleration of the elevator's descent, and the number of drops. However, such approaches do not offer individualized variation, but rather variations that are randomized and applied equally to a group of participants.

Mixed-reality offers the potential to make greater levels of individualization and variety possible, but mixed-reality "rides" have so far largely fallen short. For example, the New Revolution Galactic Attack® (Galactic Attack® and all Galactic Attack®-based trademarks and logos are trademarks or registered trademarks of Six Flags Theme Parks, Inc. and/or its affiliates) at two Six Flags® (Six Flags® and all Six Flags®-based trademarks and logos are trademarks or registered trademarks of Six Flags Theme Parks, Inc. and/or its affiliates) parks utilize an Oculus® (Oculus® and all Oculus®-based trademarks and logos are trademarks or registered trademarks of Facebook Technologies, LLC and/or its affiliates) VR headset that plays the same VR experience for every rider, and allows for no variation or customization between riders.

With wider adoption of VR and AR in the industry, there is an opportunity to take these experiences to new levels that were not possible before with traditional systems. As such, disclosed embodiments recognize that it is desirable to implement a system that utilizes sensors embedded in the equipment and/or environment of a mixed-reality entertainment experience to gather data regarding the user, use the gathered data, historical user preferences, and various types of analysis to model the multiple dimensions comprising the user's experience, identify the individual parameters of the mixed-reality experience that correlate with strong user experiences, aggregate the parameters with those of other users to identify groups or cohorts of users with statistically similar optimal parameters. Some such embodiments train a machine learning system to learn optimal parameters for the identified cohorts, and group users into best-fitting identified cohorts who will encounter the experience together under the same virtual and/or physical parameters of the mixed-reality experience. The parameters are selected by a machine learning system to improve the cohort's mixed-reality experience in a precise and tailored fashion.

In some embodiments, a system distinguishes between, and measures the experience of, users both in line for the mixed-reality experience and currently experiencing the mixed-reality experience. In some such embodiments, the system analyses the effect that parameter adjustments have on users produced in the experience, and implements parameter adjustments to this and other cohorts to improve the experiences of all users participating in the mixed-reality experience, whether they be currently participating in the mixed-reality experience or waiting their turn in line.

According to one embodiment, a system for measuring the experiential state of a user participating in a mixed-reality experience correlates spikes in the user's experiential state with particular features comprising the mixed-reality experience, and predicting changes to the mixed-reality experience that would improve the experiential state of the user.

As described herein, a user may be any individual participating in a mixed-reality experience or part of a queue to join a mixed-reality experience. A participant may be any individual who is taking part in the mixed-reality experience.

In some embodiments of the invention, the mixed-reality experience may be an entertainment experience that comprises any combination of both virtual and physical elements. Physical elements may include the real-world tangible components of the experience, including vehicles such as gondolas, trams, rollercoasters, monorails, locomotives, dodgems, et cetera; mechanisms or structures designed to rotate, tilt, swing, invert, drop, or otherwise physically manipulate participants such as motion simulator platforms, centrifuges, drop towers, swings, pendulums, et cetera; terrain features; props or equipment such foam objects or infrared laser tag implements or rollerblades; features of the physical environment such as lighting, railings, smoke effects, signage, et cetera; buildings and structures; and so on. Virtual elements may include the digital components of the virtual experience that are modelled in a virtual environment which may be mapped to or otherwise correspond with places and objects within the physical world, including virtual scenes such as haunted house, athletic/playing field, track, et cetera; virtual set pieces such as avalanches, monster attacks, et cetera; augmented reality elements such as safety instructions, advertisements, navigational instructions, virtual signage, et cetera; virtual creatures such as pets or monsters, et cetera. Virtual elements may be interactive, responding to a participant's movement, speech, orientation, et cetera.

In some embodiments, participants perceive the virtual elements via devices such as VR headsets, smart glasses, tablets, mobile phones, et cetera, which may be general purpose devices owned by users or may be customized or specialized for an individual mixed-reality experience or class of mixed-reality experiences. The ratio of virtual elements to physical elements may vary considerably; for example, on one end of the spectrum, the mixed-reality experience may be largely virtual with minimal physical elements, such as an interactive virtual environment mapped to a physical location such that the movement of one or more participants in the virtual environment is mapped to their location and movement in the physical world. On the other end of the spectrum, a mixed-reality experience may be largely physical with minimal virtual elements, such as a rollercoaster with virtual safety warnings, instructions, and ingress-egress points overlaid onto the cars.

In some embodiments, reality experience accommodates a limited number of participants, and may therefore employ a queue system to track individuals who are waiting to take part in the mixed-reality experience. The queue may be physical, ordering individuals in a line corresponding with the order in which the individuals will be allowed to enter the mixed-reality experience, or the queue may be virtual, digitally tracking the individuals in the line, as identified, for example, by name, face, assigned ID number, et cetera, and the order in which they are allowed to enter the mixed-reality experience. The queue may also be a mixture of both, for instance keeping individuals in the queue within a designated area but tracking their place in line digitally. The queue may further comprise some means of alerting the individual of their place in line and/or when their turn has been reached to enter the mixed-reality experience.

Of the virtual and physical elements comprising a mixed-reality experience, the subset of elements that can be individually manipulated or altered to customize or change the mixed-reality experience for all participants or some subset of participants, including individual participants, may be herein referred to as experience parameters. The experience parameters may be virtual or physical, and may include lighting in both physical and digital environments, speed and acceleration of vehicles, movement choreography of motion platforms or other mechanical devices, audio volume, duration of the experience, et cetera. The granularity of experience parameters with respect to the number of participants affected may vary based on the experience parameter. In other words, the most granular experience parameters may be manipulated or altered on a participant-by-participant basis to customize individual participant's experiences, whereas manipulation or alteration of less granular experience parameters may change the mixed-reality experience of a larger subset of participants. For example, in a mixed-reality experience comprising a physical locomotive where the windows of passenger compartments are overlaid with virtually modelled landscapes, changes to the speed of the locomotive must necessarily affect all passengers, while changes to the virtual landscape on the windows may be customized for each individual passenger.

In some embodiments of the invention, the experiential state of a user, herein also referred to as a User Experience Coefficient (UXC) may be a value quantifying the overall experience of the user within the context of the mixed-reality experience on a spectrum, where values towards one end of the spectrum represent unpleasant or poor user experiences, and values on the other end of the spectrum represent positive user experiences. The experiential state may be calculated or updated continuously at regular time intervals throughout the user's time waiting in the queue or taking part in the mixed-reality experience, such that the user's experiential state may be modelled over time. The experiential state may be calculated based on a variety of information that may indicate the mental state of the user, and information that indicates the extent to which a given mental state of the user corresponds with a positive experience or a negative experience. Information that may indicate the mental state of the user may include, for example, biometric data of the user, spatial data of the user, stress analysis of the user, sentiment analysis of the user, et cetera. Information that indicates an extent to which a given mental state of the user corresponds with positive or negative experiences may include crowdsourced or historical data, user feedback, machine learning, user preferences, et cetera.

In some embodiments, the system calculates two different experiential states; one experiential state is calculated from data gathered while the user is in a queue, and one experiential state is calculated from data gathered while the user is taking part in the MR experience. In some embodiments, the system may annotate gathered data indicating whether the data was gathered while the user was in the queue or the MR experience.

Biometric data may be any data pertaining to physiological traits or behavioral characteristics of a user. Biometric data may include heart rate variations, breathing rate variations, blood pressure, skin hidrosis, diaphoresis, fingerprints, height, pupil dilation, retinal patterns, etc. Biometric data may be collected by sensors, such as cameras or fingerprint readers in users' mobile devices, cameras installed within a threshold distance of the physical location of the mixed-reality experience, cameras or other sensors integrated into the mixed-reality device such as a virtual reality headset, vitality data from wearable vitality trackers, et cetera. In some embodiments, the system may continuously gather biometric data pertaining to one or more users, up to and including all users, at regular intervals. The system may gather biometric data in real time or substantially real time.

Spatial data may be data pertaining to the position, orientation, and distance between physical objects, including individuals such as the user. Spatial data may be derived from an aggregation of geo location features available in the smart/wearable devices of users or other individuals within a threshold distance of a physical location of the mixed-reality experience, where geo location features may be software agents capable of deducing the geographical location of a device connected to the Internet, for example using the IP address, MAC address, et cetera. Spatial data may also include geolocation data gathered by sensors such as global positioning systems, microlocation data gathered via near field communications, Bluetooth, RFID tags, beacons, et cetera, and any other location data gathered for instance via cameras and motion detectors, laser rangefinders, et cetera. In some embodiments, the system may continuously gather spatial data pertaining to one or more users, up to and including all users, at regular intervals. The system may gather spatial data in real time or substantially real time.

Communications data may be user text conversations, extracted for instance from messaging applications on a user's mobile device, or, in embodiments where the system employs a chatbot, text conversations conducted directly between the user and the system. Communications data may further include the user's audible speech, as for example recorded by microphones in the user's mobile devices, MR devices, or deployed in the environment of the mixed-reality experience. In some embodiments, the system may continuously gather communications data pertaining to one or more users, up to and including all users, at regular intervals. The system may gather communications data in real time or substantially real time.

Sentiment analysis may be a method of inferring the current view or attitude of a user towards the mixed-reality experience or any of the virtual or physical elements comprising the mixed-reality experience. Sentiment analysis may include processing communications data pertaining to a user using text processing techniques such as entity and corpus linguistic methods and/or speech processing methods to determine the user's sentiment at any given moment during the user's participation in the mixed-reality experience; the system may further attempt to determine whether the sentiment is directed towards the mixed-reality experience, and if so, what mixed-reality elements the sentiment is particularly directed to. In some embodiments, the system may continuously perform sentiment analysis on all users or a subset of users, at regular intervals. The system may perform sentiment analysis in real time or substantially real time.

Stress analysis may be a method of determining the stress, or cognitive workload, affecting a user. In some embodiments, the system may perform stress analysis on the biometric data to determine a mental state; a user may indicate a level of stress through their behavior and/or through involuntary physiological changes. For example, heart rate variations, breathing rate variations, blood pressure, skin hidrosis, diaphoresis, and pupil dilation may all indicate a level of cognitive workload experienced by the user. In some embodiments, the system may continuously perform stress analysis on all users or a subset of users, at regular intervals. The system may perform stress analysis in real time or substantially real time.

In some embodiments, the system may determine whether a given user is in the queue or is taking part in a mixed-reality experience. In some embodiments, such as where the queue is a logical construct implemented on software, the system may consult the queue to determine whether the user is identified among the users within the queue; if the user is identified within the queue, the system may conclude that the user is in the queue. In some embodiments, such as where the queue is physical, the system may use the spatial data and image processing to identify whether the user is present in the physical location associated with the queue, and/or use biometric data to determine whether the user is exhibiting behaviors consistent with waiting, such as standing in a line of other users and/or standing still for long periods of time, et cetera. The system may determine if the user is taking part in the MR experience by, for example, consulting the queue and/or past versions of the queue to determine if the user recently reached the first position in line before being taken off the queue, and/or use sensors to identify the user as wearing a mixed-reality device, being physically present within the bounds delineated for the mixed-reality experience, et cetera. The system may make this determination continuously at regular intervals, and may track the position of users relative to the queue or the MR experience in real time or substantially real time.

In some embodiments of the invention, the system may perform a queue analysis to determine which individuals waiting to enter a mixed-reality experience should be considered users of a mixed-reality experience for the purposes of including them within the co-evolution step of the user experience orchestration process. The co-evolution step may be a step where the system uses the experiential state or alterations to the experience parameters of participants to facilitate communication with or alter the experiential state of users in the queue, or to attract individuals to join the queue and become users. The system may identify individuals waiting to enter the mixed-reality experience as users based on the immediateness of the participant about to initiate the experience, and may perform initial categorization and user pre-classification based on historic experiences. In the case of a ride with multiple cars (vehicles), then the system may consider the characteristics of the riders of each car, and categorize, for example by average, those characteristics of the riding cohort and map to those comparable characteristics of individuals still waiting in the queue. The similarity between users in the vehicle and users in the queue may be represented as categorization affinity. This categorization affinity may be employed when the system cannot find a 100% match so needs to find a compromise for a shared car. For example, if the system has place in a car for 10 riders but cannot find 10 riders in the queue with the same preferences, then it will start going up in the hierarchy of the categorization for the monitored characteristics to find a categorization that is common, generic enough but still compatible among the riders in queue, as represented by users with the highest categorization affinity. This categorization analysis may apply when the system is making the selection of what riders in the queue should be put together on a car. For example the queue analysis may include pre-selection of a vehicle based on participant categorization affinity (ca). This ca value is a contingency parameter needed when vehicles have limited or low intersecting configuration parameters. For example, one vehicle accepts X values between 20 and 60, and another vehicle accepts X values between 50 and 90. This value is important in pre-selecting a function of User Experience Coefficient (UXC) defined in the next step. The system may determine a line break point beyond which individuals in the queue might be too far back to initiate in the experience. This returns a number h, which may represent the number of individuals within the line break point. The system may calculate a critical mass coefficient k, which may be a dynamically calculated threshold indicating the minimum set of participants needed in a queue. k may calculate in function of vehicles available c, duration of the experience d, time for the participants to move in and out t, and the number of participants needed to maximize utilization of vehicle n. Possible values include:

k=1 critical mass k<1 subcritical mass k>1 supercritical mass

The outputs from the line analysis step may be ca, h, and k. These values will be used later when deriving the co-evolved user experience orchestrator (CUE-O) and remediation models depending on what remediation methods are called for in a given situation. For example, the ca can be used to "water down" some of the runtime parameters in order to scale back an intensity of a mixed-reality experience to satisfy participants with similar characteristics, where characteristics may include user preferences, for example with regard to individual experience parameters and/or broader effect or aesthetic created or modified by an experience parameter or group of experience parameters. If there is not critical mass, then the system might opt to run a randomizer function instead of a personalization function.

In some embodiments of the invention, the system may create a model to provide a mapping between salient features of the user's experiential state, or UXC, over time, and experience parameters to which they correspond. This model may be referred to as the experience enhancing drivers (UXD) model. The UXD may identify one or more salient features by consulting the UXC over time and identifying regions where the UXC exceeded an upper threshold or fell below a lower threshold, where for example the upper threshold represents a value of the experiential state above which the experiential state can be considered to represent a positive experience, and the lower threshold indicates a value of the UXC below which the UXC can be considered to represent a negative experience. Additional thresholds may be employed, and the thresholds may be established or adjusted, for example, based on machine learning or user feedback. The UXD may be pre-provided with experience parameter information, which may include a list of all experience parameters present and/or controllable by the system, and may include contextual information regarding experience parameters that may be helpful in determining whether and when a user encountered a given experience parameter. For example, the contextual information may include the location of experience parameters that are bound to a location, or the location of experience parameters that are mobile (train, virtual creature) at regular intervals. For more abstract experience parameters, such as motion, visual or audio effects, traits such as speed or acceleration, et cetera, the contextual information may include the times at which the effects or conditions were present and/or the users or area affected by the effects or conditions. The UXD may compare the time intervals corresponding with the salient features to the user's location during those time intervals. The UXD may determine what experience parameters were visible to the user, producing an effect on the user, or otherwise present in the vicinity of the user such that the experience parameter may have contributed to the salient feature of the user's UXC, and may mark such experience parameters as potential experience parameters. For example, the UXD may use cameras to identify where the user was looking, and may identify all visible experience parameters in that direction as potential experience parameters. In some embodiments of the invention, the UXD outputs all potential experience parameters associated with the salient features. In some embodiments the UXD may use machine learning methods to identify a likelihood that any given potential experience parameters contributed to or caused the salient feature in the user's UXC based on patterns previously identified; for example, the UXD may determine a likelihood based on whether the same type of experience parameters produced a similar effect on the experiential state of similar users in the past, whether the same type of experience parameters produced a similar effect on the experiential state of the same user in the past, et cetera.

In some embodiments of the invention, if the UXC curve is flat, or without significant variations, representing boredom or a lack of strong feelings or reactions on the part of the user, then the system might adjust runtime parameters to "shake" the UXC; in other words, the system might adjust runtime parameters that may be likely to affect the user's experiential state in a positive way, as determined in conjunction with historic understanding of previous UXCs for the user and/or comparable users, in an attempt to improve the user's experiential state or to gather information on the relationship between the user's experiential state and alterations to experience parameters.

In some embodiments of the invention, the system creates a CUE-O model from the UXC and the output of the UXD. The CUE-O models represent the relationship between the different experience parameters and how the users respond to them. This model also provides a communication and information exchange method between the users participating in the experience and those waiting in line. The CUE-O model enables the system to analyze in real time the user's current state, derive user preferences from previous experiences and predict what parameters could be altered that will result in a better experience.

In some embodiments of the invention, the system may use the CUE-O model may derive user preferences by analyzing the experience parameters corresponding with salient features of the user's experiential state and determining which experience parameters produce a positive effect on the user's experience, and which experience parameters have a negative effect on the user's experience. The system may predict changes to the experience parameters that would produce a positive effect on the user's experiential state, based on, for example, how changes to such experience parameters affected the experiential state of similar users in the past. Additionally, based on analysis of UXDs belonging to many users over time, the system may identify relationships between experience parameters, such that a user's positive or negative experiences with certain experience parameters or combinations of experience parameters may be predictive of how related experience parameters may affect the user's experiential state. As an example, from the calculated User Experience Coefficient (UXC), the system can derive that User A loves experience parameters associated with fast rides but hates experience parameters associated with things that makes him feel dizzy. The system may therefore predict that adjusting the virtual experience parameters to minimize dizziness during the mixed-reality experience would have a positive effect on User A. The system may further predict that adjusting other experience parameters to increase the intensity of the mixed-reality experience would further improve User A's experience. In another example, User A is excited for the last ride of the day; the system knows that User A exhibits a predilection for thrill-seeking. The system may accordingly predict that adjustments to the experience parameters to maximize the thrilling characteristics of the experience that particularly resonate with the profile of the user, for example speed and acceleration of the ride, or aggressiveness of monsters within a virtual environment, would improve the experience of User A. In another example, User A recently ate lunch and is prone to motion sickness; the system may predict that reducing the intensity of key experience parameters may maximize User A's comfort during the experience. In some embodiments of the invention, experience parameters which are related, such that changes to all related experience parameters produce a unified effect on a user's experience, may be grouped together. For example, experience parameters such as speed, acceleration, vibrancy of a virtual environment, volume, aggression of virtual monsters, et cetera may all be relevant to the intensity of the experience, such that increasing all such parameters increases the intensity, and decreasing the parameters decreases intensity, and may be grouped together. Another grouping of experience parameters might be tied to whimsey, or calmness, or scariness, depending on the experience parameters and the nature of the mixed-reality experience.

In some embodiments, the system identifies cohorts and associated parameters using aggregated modeling and analysis results. In some embodiments, the system accepts the UXC, the UXD, and the line analysis data as inputs. In some embodiments, the system identifies cohorts of users and associated parameters using aggregated modeling and analysis results from current and past user experiences. For example, in some embodiments, the system derives a Hierarchical Cohort Predictor (HCP) model based on UXD, UXC, and line analysis data, resulting in a model that represents a relationship between the different parameters of the experience that translate to specific stimuli and how the user responds to them. This and other HCP models are aggregated and analyzed to identify ideal participant clustering for maximizing the experience as a cohort for a common set of UXDs. In some embodiments, the system analyzes the runtime parameters (stimuli) from the UXD 422 and the individual responses from the UXC 420 to identify patterns and create clusters associating runtime parameters with user responses. In some such embodiments, the system deconstructs and generalizes the identified patterns into simplified, comparable elements. In some such embodiments, for simplicity, the system uses the same elements used for the UXC 420 model, for example communication patterns, runtime patterns, biometric patterns, relative stress patterns, and/or sentiment patterns.

In some embodiments, the system identifies user cohorts and associated parameters using a quantitative analysis that takes an unbiased/emergent approach to the analysis. In some such embodiments, the system performs both a training phase and a clustering phase, both of which include computerized feature extraction to generate a set of parameters for each cohort. In an embodiment, each cohort represents a group of users for whom a particular intensity level is associated with an optimal experience. As a non-limiting example, a particular park attraction that involves motion that applies different amounts of G-forces to different cohorts, where the passengers are grouped into the cohorts according to preferred intensity levels; for a first cohort of users who prefer low-intensity experiences, G-forces applied to ride passengers is capped at a first value; for a second cohort of users who prefer moderate-intensity experiences, G-forces applied to ride passengers is capped at a second value (higher than the first cap value used for the first (low-intensity) cohort); and for a third cohort of users who prefer high-intensity experiences, G-forces applied to ride passengers is capped at a third value (higher than the second cap value used for the second (moderate-intensity) cohort). Actual implementations may involve additional/alternative parameters, and may divide riders into any number of cohorts of varying preferences.

In an embodiment, the resulting sets of parameters provide optimal user experiences for each cohort. Utilization of the UXC data enables quantitative characterization of the overall user population present within the experience or queued for the experience. Both the training phase and the clustering phase include a statistical hierarchical agglomerative clustering technique (described in greater detail in connection with FIG. 5) to classify users by quantitative reactions to applied stimuli. The clustering analysis categorizes the users into different groups or cohorts based on similarities between the user reactions to certain stimuli. For example, for a given stimulus applied to each user, such as a jump-scare effect, a first group may react with disapproval, discomfort, or dislike, whereas another group of users may react almost unphased by the same stimulus. In an embodiment, hierarchical agglomerative clustering is used for both training the model and utilizing the trained HCP model for determining intensity preferences of unknown users. In an exemplary embodiment, identifying information for the users is not collected or is masked during training phases to prevent encoding bias.

In some embodiments, hierarchical agglomerative clustering incorporates measures related to cognitive perception and proprioception to maximize performance of a user experience. The resulting experience analysis and performance prediction determines the response of basic cognitive performance indicators that support and alter different levels of experience performance in a cohort. Such embodiments determine a cognitive workload profile and the subsequent computation of a single number measure of cognitive workload. The use of this method will perform dynamic and micro-based adjustments to crucial attributes of a user experience and arrive at a single adjustment tailored to a cohort. In some embodiments, the system includes a machine learning discriminator capabilities that use historical user responses to predict the probability of various experience enhancement driver values being optimal. In some embodiments, user responses are measured from both users participating in the experience and users waiting in line to participate, and communication between the two groups.

In some embodiments of the invention, the system may user the cohort model to perform co-evolution, which may include facilitating interaction between participants and users in the queue to improve the experiential state for one or both groups. In other words, co-evolution may be taking input from those waiting in the queue and changing the runtime parameters accordingly for those in the actual ride, to change the experience for those in the ride, which then is relayed to those in the queue ultimately improving their pre-ride experience. Co-evolution may include providing a feedback loop between those experiencing the ride and those waiting to get in, which may include adjusting the mixed-reality experience for a cohort based on the experiential state of users in the queue. For example, if a second cohort waiting in line is too calm and does not seem interested in the experience, the system could alter the experience parameters to increase the intensity of the mixed-reality experience that the first cohort is currently taking part in. The altered experience parameters for the first and second cohorts may be kept for other cohorts taking part in the MR experience. Co-evolution may also include communicating the experiential state of participants to users in the queue to improve the experiential state of the users in the queue. This communication may be something as simple as broadcasting, on displays visible to those in the queue, how much the users in the ride are "screaming" in excitement (or panic). This "communication" would affect the experiential state of those in the queue, potentially making them feel more excited for the MR experience. Other ways to communicate may include using mobile apps that share some UXC information. In some embodiments, the system may change the ambience lighting to communicate UXC to those in the queue; then, by observing the responses by those in the queue, the system may alter the runtime parameters. Co-evolution communication may take place where there is a match (or affinity) between those in the queue and those in the ride.

In some embodiments of the invention, the system may execute remedial actions to implement the predicted changes to the mixed-reality experience. The remedial actions may be any actions that serve to carry out the predicted changes to the experience parameters. The invention may electronically interface with mechanical and software components of the mixed-reality experience such that the system may send commands to execute the changes in both hardware and software environments. In some embodiments to the invention, alterations to grouped experience parameters may be executed simultaneously. In embodiments where changes to an experience parameter would affect multiple participants, the system may only make the changes where the system predicts that the changes would have a neutral or positive effect on the experiential state of all affected participants. In some embodiments, for example where queue analysis determines that the number of users in the queue is below a desired number, the system may communicate with nearby individuals with compatible experiential states to join the queue, for example utilizing synthesized or recorded speech through speakers, messages to the user's mobile device, via displays, augmented reality graphical elements, et cetera.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
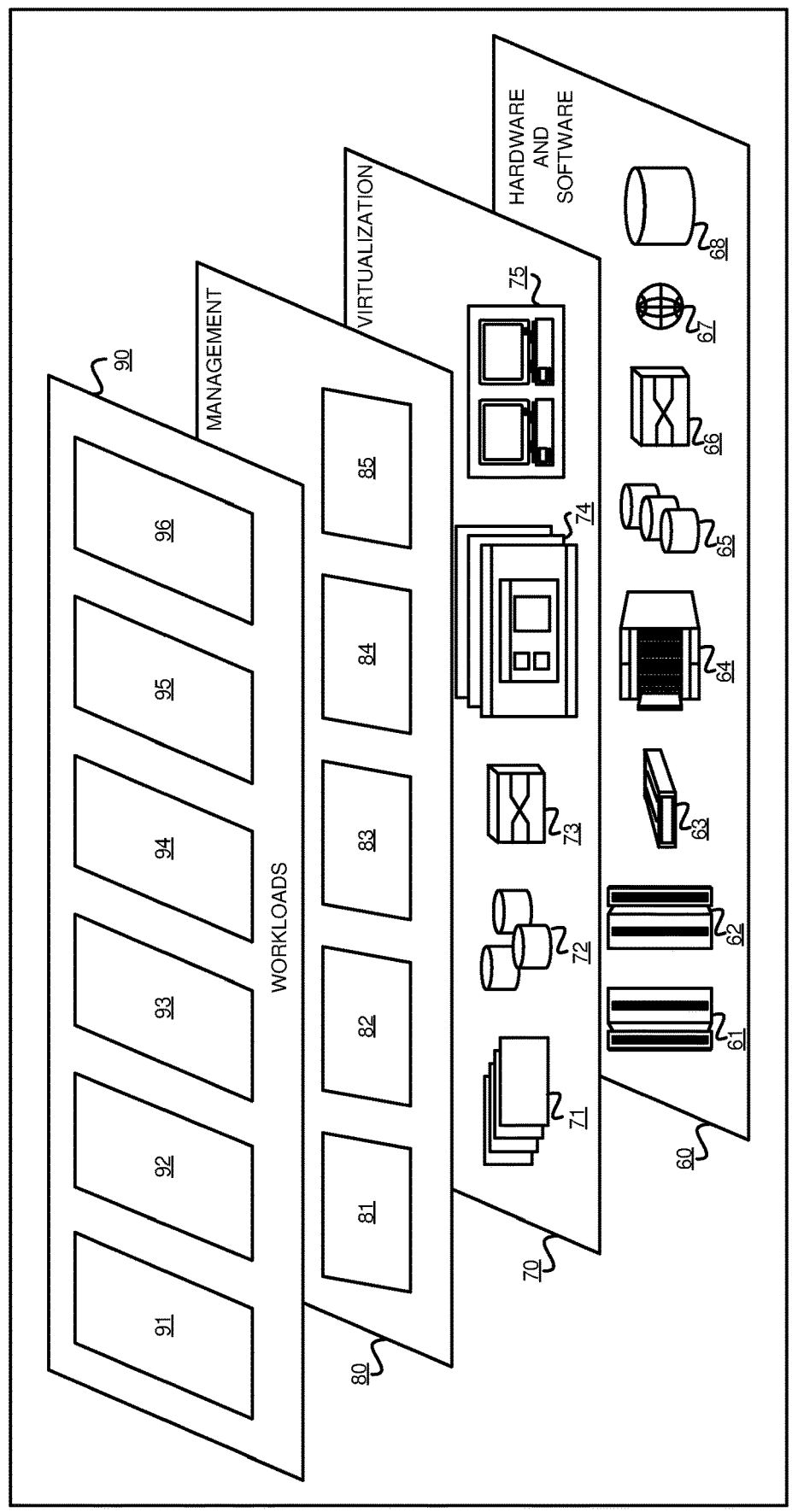
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cohort experience orchestrator 96. The cohort experience orchestrator 96 may be enabled to analyze the current state of a user participating in a mixed-reality (MR) experience, derive user preferences from previous experiences, and thereby predict what parameters of the MR experience could be altered to improve the user's experience.

Figure 3:
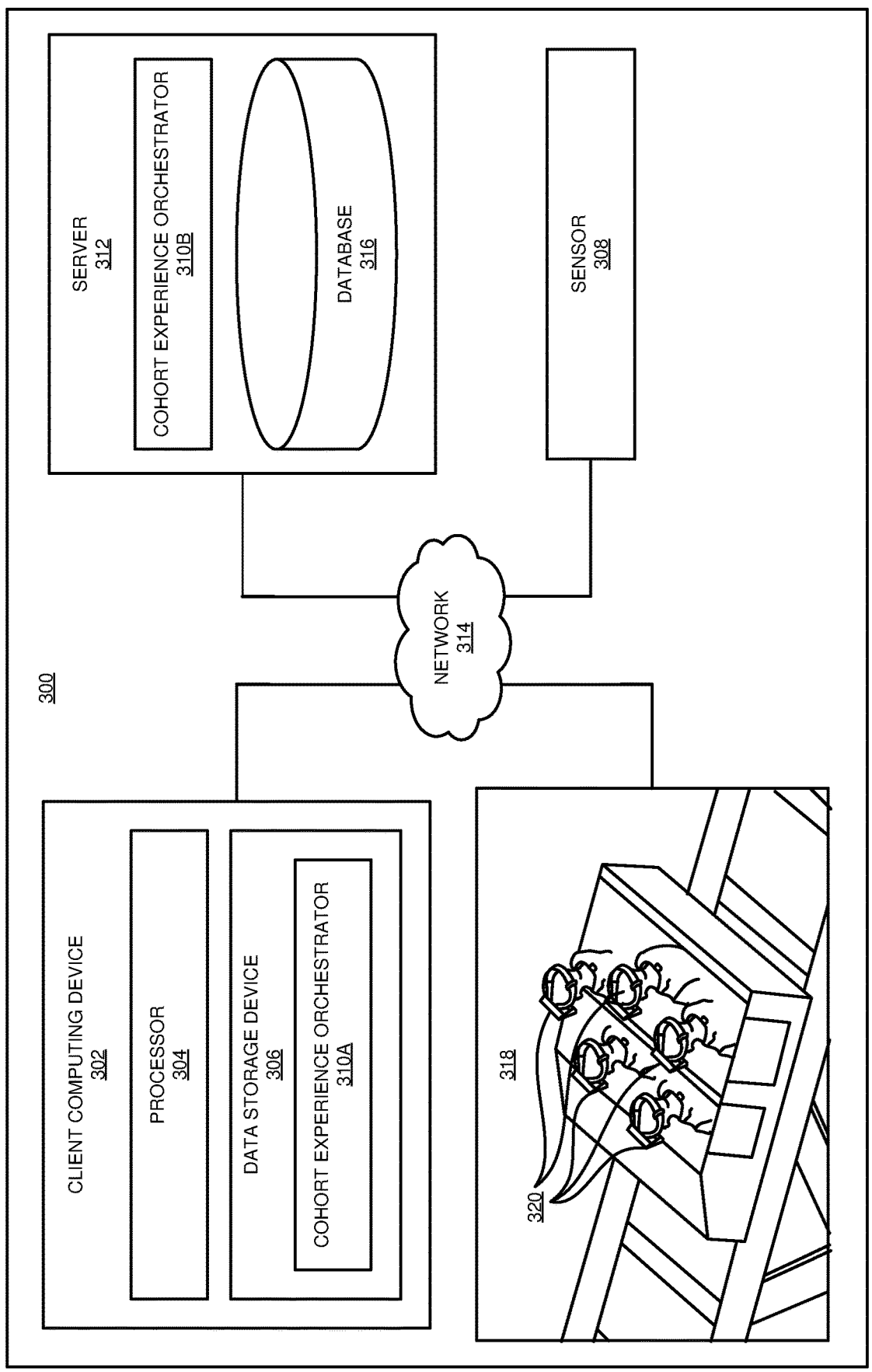
FIG. 3 depicts a block diagram of an exemplary networked computer environment that includes a cohort experience orchestrator in accordance with an illustrative embodiment.

With reference to FIG. 3, this figure depicts a block diagram of an exemplary networked computer environment 300 that includes a cohort experience orchestrator 310A, 310B in accordance with an illustrative embodiment. In some embodiments, the cohort experience orchestrator 310 is deployed in workloads layer 90 of FIG. 2. By way of example, in some embodiments, cohort experience orchestrator 310A, 310B is implemented as cohort experience orchestrator processing 96 in FIG. 2.

In the illustrated embodiment, the networked computer environment 300 includes client computing device 302 and a server 312 interconnected via a communication network 314. According to at least one implementation, the networked computer environment 300 includes a plurality of client computing devices 302, servers 312, sensors 308, and a cohort set of mixed-reality (MR) devices 320 for members of a cohort 318.

Embodiments of the communication network 314 include various types of communication networks, such as a wide area network (WAN), local area network (LAN), a telecommunication network, a wireless network, a public switched network and/or a satellite network. Embodiments of the communication network 314 include connections, such as wire, wireless communication links, or fiber optic cables. FIG. 3 provides only an illustration of one implementation and does not imply any limitations with regard to the environments in which different embodiments may be implemented. Many modifications to the depicted environment may be made based on design and implementation requirements.

In some embodiments, client computing device 302 includes a processor 304 and a data storage device 306 that is enabled to host and run a cohort experience orchestrator program 310A and communicate with the server 312 via the communication network 314, in accordance with one embodiment of the invention. Client computing device 302 may be, for example, a mobile device, a telephone, a personal digital assistant, a netbook, a laptop computer, a tablet computer, a desktop computer, or any type of computing device capable of running a program and accessing a network. In some embodiments, client computing device 302 may be a mixed-reality device 320 and/or may be integrated into a mixed-reality device 320.

In some embodiments, mixed-reality (MR) device 320 is a device that allows a user to perceive a mixed-reality environment. In some embodiments, the mixed-reality device 320 is equipped with a display that can render a virtual environment, and hardware or software that enables the device to track its location and motion relative to the physical world, and by extension relative to virtual objects mapped to locations in the physical world. In some embodiments, the mixed-reality device 320 is a general-purpose device owned by users or is customized or specialized for an individual mixed-reality experience or class of mixed-reality experiences. In some embodiments, mixed-reality devices 320 include such devices as VR headsets, AR headsets, smart glasses, tablets, mobile phones, and other such devices. In some embodiments, users wear or utilize mixed-reality devices 320 while taking part in a mixed-reality experience, and may or may not wear or utilize mixed-reality devices 320 while waiting in a queue to take part in the experience. In some embodiments, a user may employ multiple different mixed-reality devices 320 over the course of waiting in the queue and participating in the mixed-reality experience. In some embodiments, a mixed-reality device 320 is enabled to communicate with cohort experience orchestrator program 310A, 310B residing within client computing device 302 and/or server 312 via the communication network 314.

In some embodiments, the sensor 308 comprises one or more devices capable of recording data that is relevant to stress analysis, sentiment analysis, line analysis, and/or an experiential state of a user, which may include spatial data, communications data, biometric data, and other data. As such, in some embodiments, sensors 308 are integrated into mixed-reality device 320, client computing device 302, sensors 312, and/or are deployed in the environment of the mixed-reality experience and/or the environment of the queue for the mixed-reality experience. In some embodiments, the sensors 308 include cameras, fingerprint readers, pupil or retinal scanners, scales, global positioning systems, RFID tags, motion detectors, laser rangefinders, and microphones. In some embodiments, the sensors 308 are enabled to communicate with cohort experience orchestrator program 310A, 310B residing within client computing device 302 and/or server 312 via the communication network 314.

In some embodiments, the server 312 comprises one or more of a laptop computer, a netbook computer, a personal computer (PC), a desktop computer, or any programmable electronic device or any network of programmable electronic devices capable of hosting and running a cohort experience orchestrator program 310B and a database 316 and communicating with the client computing device 302 via the communication network 314. In some embodiments, the server 312 operates in a cloud computing service model, such as Software as a Service (SaaS), Platform as a Service (PaaS), or Infrastructure as a Service (IaaS). In some embodiments, the server 312 is located in a cloud computing deployment model, such as a private cloud, community cloud, public cloud, or hybrid cloud.

According to the present embodiment, the cohort experience orchestrator program 310A, 310B may be a program enabled to analyze the current state of users participating as a cohort in a mixed-reality (MR) experience, derive preferences from previous experiences, and thereby predict what parameters of the MR experience could be altered to improve the cohort users' experience. In some embodiments, the cohort experience program orchestrator 310A, 310B is located on client computing device 302 or server 312 or on any other device located within network 314. Furthermore, in some embodiments, the cohort experience program orchestrator 310A, 310B is distributed in its operation over multiple devices, such as client computing device 302 and server 312.

Figure 4:
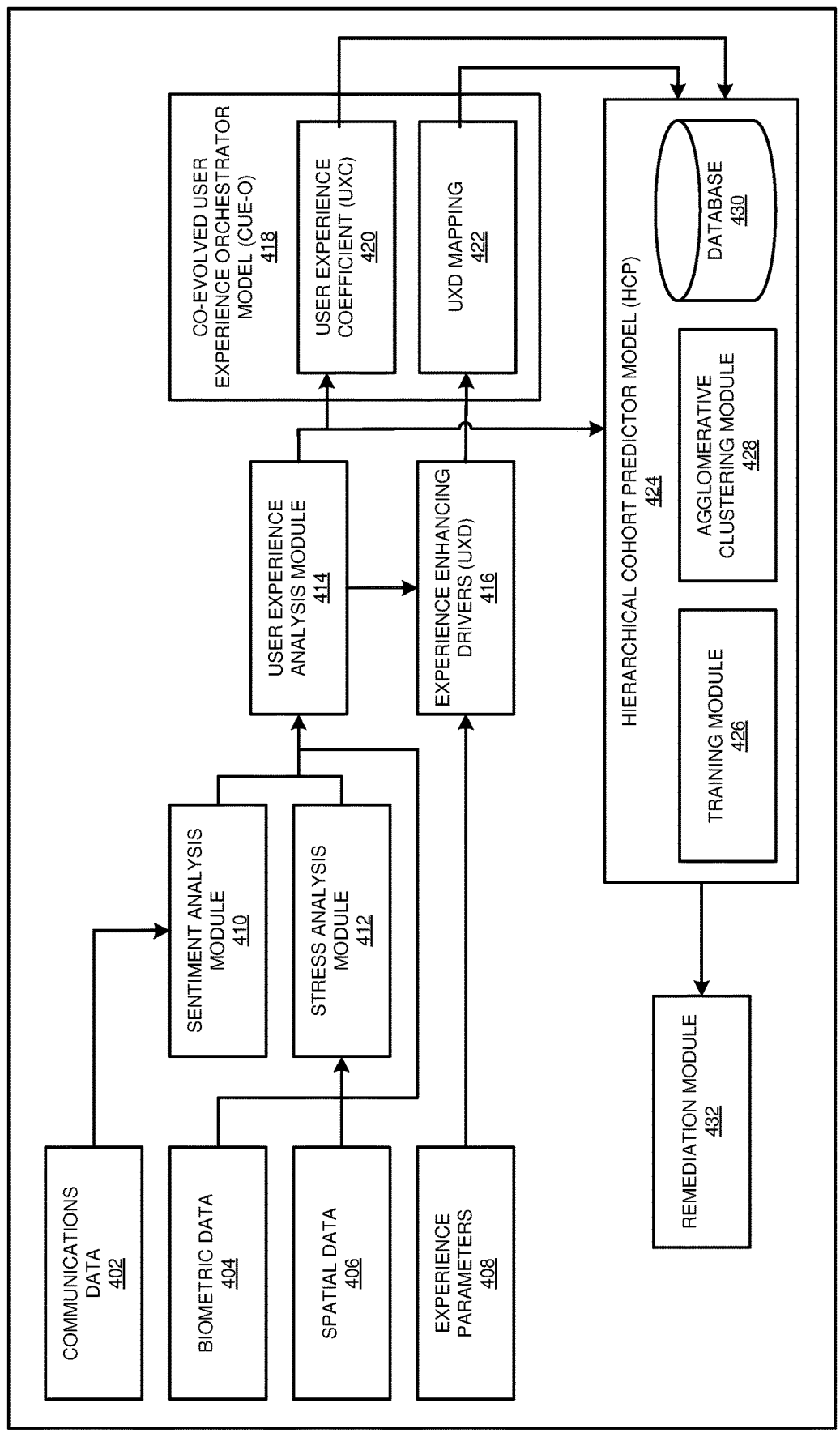
FIG. 4 depicts a block diagram of an exemplary system that includes a cohort experience orchestrator in accordance with an illustrative embodiment.

With reference to FIG. 4, this figure depicts a block diagram of an exemplary system 400 that includes a cohort experience orchestrator in accordance with an illustrative embodiment. In an exemplary embodiment, the system 400 is an example of the cohort experience orchestrator program 310A, 310B of FIG. 3.

In the illustrated embodiment, the sentiment analysis module 410 accepts communications data 402 as input, and transmits sentiment modeling as output to user experience analysis module 414. In some embodiments, the sentiment modelling includes inferring the current view or attitude of a user towards the mixed-reality experience or any of the virtual or physical elements comprising the mixed-reality experience. In some embodiments, sentiment modelling includes processing communications data 402 pertaining to a user using text processing techniques such as entity and corpus linguistic methods and/or speech processing methods to determine the user's sentiment at any given moment during the user's participation in the mixed-reality experience. In some such embodiments, the sentiment analysis-module 410 further attempts to determine whether the sentiment is directed towards the mixed-reality experience, and if so, what mixed-reality elements the sentiment is particularly directed to.

In the illustrated embodiment, the stress analysis module 412 accepts biometric data 404, spatial data 406, and sentiment modelling 410 from sentiment analysis module 410 as inputs, and transmits a user experience coefficient (UXC) 420 to CUE-O 416 and experience analysis module 414. In some embodiments, the stress analysis module 412 performs a stress analysis based on the biometric data 404 and spatial data 406. In some such embodiments, the stress analysis includes a method of determining the mental stress, or cognitive workload, affecting a user, and determines a mental state from the biometric data 404. In some embodiments, a user indicates a level of stress through their behavior and/or through involuntary physiological changes. Movement of the user, based on spatial data 406, may also indicate behaviors that imply stress, such as pacing.

In the illustrated embodiment, the user experience analysis module 414 calculates the UXC 420 based on the sentiment modeling from sentiment analysis module 410, the stress analysis from stress analysis module 412, the spatial data 406, and the biometric data 404. In some such embodiments, the UXC 420, or experiential state of a user, is a value quantifying the overall experience of the user within the context of the mixed-reality experience on a spectrum, where values towards one end of the spectrum represent unpleasant or poor user experiences, and values on the other end of the spectrum represent positive user experiences. In some embodiments, the user experience analysis module 414 outputs the UXC 420 to the experiencing enhancing drivers (UXD) 416.

In the illustrated embodiment, the experience enhancing drivers (UXD) 416 accepts experience parameters 408 and UXC 420 from user experience analysis module 414 as inputs, and uses them to generate a mapping 422 between the UXC 420 and the experience parameters 408. In some such embodiments, the UXD 422 is a model that provides a mapping 422 between spikes, or salient features of the user's experiential state over time, and experience parameters to which the salient features correspond. In some embodiments, UXD 416 transmits the UXD mapping 422 to CUE-O 418.

In the illustrated embodiment, the CUE-O 418 accepts the UXC 420 from user experience analysis module 414, and UXD mapping 422 from the experience enhancing drivers (UXD) 416 as inputs. In some embodiments, the CUE-O 418 derives user preferences by analyzing the experience parameters corresponding with salient features of the user's experiential state and determining which experience parameters produce a positive effect on the user's experience, and which experience parameters have a negative effect on the user's experience. In some embodiments, the CUE-O 418 predicts changes to the experience parameters that would produce a positive effect on the user's experiential state, based on, for example, how changes to such experience parameters affected the experiential state of similar users in the past. Additionally, in some embodiments, based on analysis of UXDs belonging to many users over time, the CUE-O 418 identifies relationships between experience parameters, such that a user's positive or negative experiences with certain experience parameters or combinations of experience parameters may be predictive of how related experience parameters may affect the user's experiential state. In some embodiments, the CUE-O 418 may then transmit one or more predicted alterations to remediation module 432.

In the illustrated embodiment, the HCP 424 accepts the UXC 420 and the UXD 422 from the CUE-O 418, and accepts line analysis data from the user experience analysis module 414 as inputs. In some embodiments, the HCP 424 identifies cohorts of users and associated parameters using aggregated modeling and analysis results from current and past user experiences. For example, in some embodiments, the HCP 424 derives an HCP model based on UXD, UXC, and line analysis data, resulting in a model that represents a relationship between the different parameters of the experience that translate to specific stimuli and how the user responds to them. This and other HCP models are aggregated and analyzed to identify ideal participant clustering for maximizing the experience as a cohort for a common set of UXDs. In some embodiments, the HCP 424 analyzes the runtime parameters (stimuli) from the UXD 422 and the individual responses from the UXC 420 to identify patterns and create clusters associating runtime parameters with user responses. In some such embodiments, the HCP 424 deconstructs and generalizes the identified patterns into simplified, comparable elements. In some such embodiments, for simplicity, the HCP 424 uses the same elements used for the UXC 420 model, for example communication patterns, runtime patterns, biometric patterns, relative stress patterns, and/or sentiment patterns.

In some embodiments, the HCP 424 identifies user cohorts and associated parameters using a quantitative analysis that takes an unbiased/emergent approach to the analysis. In some such embodiments, the HCP 424 performs both a training phase and a clustering phase, both of which include computerized feature extraction to generate a set of parameters for each cohort. In an embodiment, each cohort represents a group of users for whom a particular intensity level is associated with an optimal experience. As a non-limiting example, a particular park attraction that involves motion that applies different amounts of G-forces to different cohorts, where the passengers are grouped into the cohorts according to preferred intensity levels; for a first cohort of users who prefer low-intensity experiences, G-forces applied to ride passengers is capped at a first value; for a second cohort of users who prefer moderate-intensity experiences, G-forces applied to ride passengers is capped at a second value (higher than the first cap value used for the first (low-intensity) cohort); and for a third cohort of users who prefer high-intensity experiences, G-forces applied to ride passengers is capped at a third value (higher than the second cap value used for the second (moderate-intensity) cohort). Actual implementations may involve additional/alternative parameters, and may divide riders into any number of cohorts of varying preferences.

In an embodiment, the resulting sets of parameters provide optimal user experiences for each cohort. Utilization of the UXC data enables quantitative characterization of the overall user population present within the experience or queued for the experience. Both the training phase and the clustering phase include a statistical hierarchical agglomerative clustering technique (described in greater detail in connection with FIG. 5) to classify users by quantitative reactions to applied stimuli. The clustering analysis categorizes the users into different groups or cohorts based on similarities between the user reactions to certain stimuli. For example, for a given stimulus applied to each user, such as a jump-scare effect, a first group may react with disapproval, discomfort, or dislike, whereas another group of users may react almost unphased by the same stimulus. In an embodiment, hierarchical agglomerative clustering is used for both training the HCP 424 model and utilizing the trained HCP model for determining intensity preferences of unknown users. In an exemplary embodiment, identifying information for the users is not collected or is masked during training phases to prevent encoding bias.

In some embodiments, hierarchical agglomerative clustering incorporates measures related to cognitive perception and proprioception to maximize performance of a user experience. The resulting experience analysis and performance prediction provided by the HCP 424 determines the response of basic cognitive performance indicators that support and alter different levels of experience performance in a cohort. Such embodiments determine a cognitive workload profile and the subsequent computation of a single number measure of cognitive workload. The use of this method will perform dynamic and micro-based adjustments to crucial attributes of a user experience and arrive at a single adjustment tailored to a cohort. In some embodiments, the HCP 424 includes a machine learning discriminator capabilities that use historical user responses to predict the probability of various experience enhancement driver values being optimal. In some embodiments, user responses are measured from both users participating in the experience and users waiting in line to participate, and communication between the two groups.

In the illustrated embodiment, the remediation module 432 accepts one or more predicted alterations as output from HCP 424. Based on the probability, remediation module 432 executes one or more predicted alterations as one or more the remedial actions. In some embodiments, the remediation module 432 executes remedial actions to implement the predicted changes to the mixed-reality experience. In some embodiments, the remedial actions are any actions that serve to carry out the predicted changes to the experience parameters. In some embodiments, the remediation module 432 electronically interfaces with mechanical and software components of the mixed-reality experience such that the remediation module 432 sends commands to execute the changes in both hardware and software environments.

Figure 5:
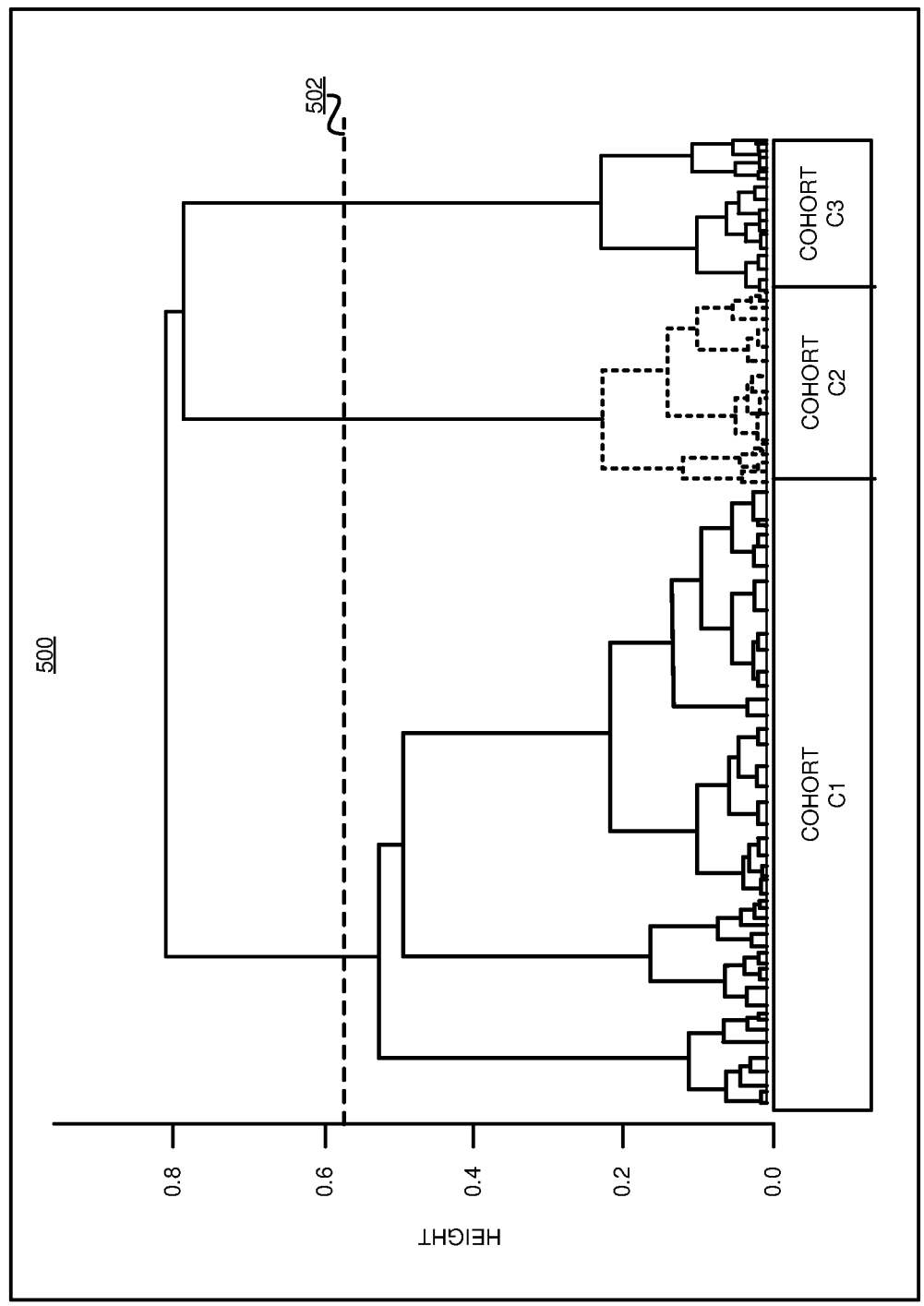
FIG. 5 depicts a cluster dendrogram that illustrates a non-limiting example of grouping passengers into cohorts in accordance with an illustrative embodiment.

With reference to FIG. 5, this figure depicts a cluster dendrogram 500 that illustrates a non-limiting example of grouping passengers into cohorts in accordance with an illustrative embodiment. In an exemplary embodiment, the cluster dendrogram 500 is generated by the HCP 424 of FIG. 4.

The cluster dendrogram 500 illustrates example data provided for explanatory reasons only. The data presented in FIG. 5 shows the users divided into three cohorts C1, C2, and C3. The groups are generated through hierarchal cluster analysis. This analysis systematically and statistically identifies samples with similar characteristics by iteratively grouping data based on similarities resulting in meaningful clusters of data of similar properties (referred to as "cohorts"). In some embodiments, the process for grouping users into cohorts includes calculating distance between cohorts. Distance is a measure of similarity between cohorts. In some embodiments, the process for grouping users into cohorts includes calculating cost of joining two or more groups, where the cost here is how much error is added by joining the groups. In some embodiments, the process for grouping users into cohorts includes joining groups that have the least merging cost, and the process is repeated until all users are joined into one group. The resulting data set essentially shows a family tree of how "related" or similar the cohorts are to each other. The height between the branches shows how related two groups are to each other. Distance on the horizontal x-axis is not indicative of any closer relationship.

The cluster dendrogram 500 shows the distance between cohorts C1, C2, and C3 as a non-limiting example. The highlighted boxes indicate single groupings. This is based on a cutoff y-axis height of 0.58 as indicated by broken line 502. In this example, cohort C1 is at a distance of 0.8 (>cutoff height of 0.58) from the combination of cohorts C2 and C3, and therefore are considered to be two separate cohorts C1 and C2+C3; then, C2 and C3 are at a distance of 0.78 (>cutoff height of 0.58) and therefore C2 and C3 also considered to be two separate groups, resulting in the three cohorts C1, C2, C3. Users within each cohort are considered to be statistically similar while those in different cohorts are considered statistically different.

To determine where the cut height is between the different cohorts, a Screen Plot such as shown in FIG. 5 can be used to examine where the distances between the cohorts are most significant. This ensures that minimal differences between samples do not overly influence the algorithm. Too small of differences will result in more likely fracturing of future samples into independent cohorts as the samples have to be too similar to cluster together than is realistic for allogeneic, cultured postnatal thymus tissue-derived product. Alternatively, the cohorts must have an appropriate cut off to ensure that there is differentiation between samples. In the case of allogeneic, cultured postnatal thymus tissue-derived product, there is high likelihood of heterogeneity due to the nature of the tissue and the lot-to-lot variability that can present itself. By examining samples that showed previous positive clinical outcomes (here defined by survival) and comparing to tissues that were degraded, the appropriate level of differentiation can be determined.

Figure 6:
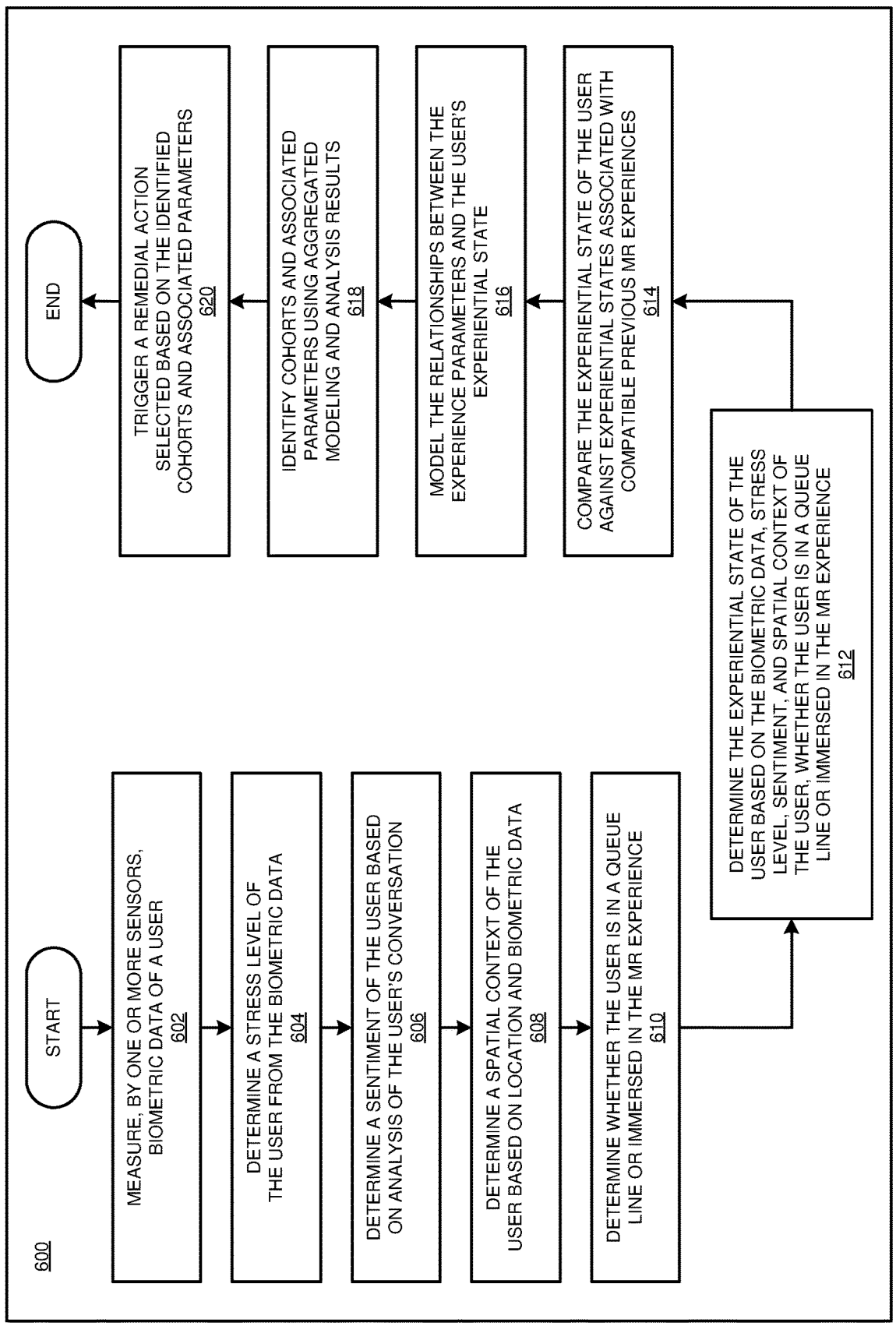
FIG. 6 depicts a flowchart of an example Hierarchical Cohort Predictor (HCP) process in accordance with an illustrative embodiment.

With reference to FIG. 6 this figure depicts a flowchart of an example HCP process 600 in accordance with an illustrative embodiment. In a particular embodiment, the system 400 carries out the process 600.

At 602, the cohort experience orchestrator program 310A, 310B measures, by one or more sensors, biometric data of a user. The user may be an individual participating in a mixed-reality (MR) experience; an individual may be considered to participate in a MR experience if the individual is immersed in the MR experience or is in a queue of individuals waiting to enter the MR experience. Biometric data may be any data pertaining to physiological traits or behavioral characteristics of a user. Biometric data may include heart rate variations, breathing rate variations, blood pressure, skin hidrosis, diaphoresis, fingerprints, height, pupil dilation, retinal patterns, etc. The cohort experience orchestrator program 310A, 310B may gather biometric data through sensors 308, such as cameras or fingerprint readers in users' mobile devices, cameras installed within a threshold distance of the physical location of the mixed-reality experience, cameras or other sensors integrated into the mixed-reality device such as a virtual reality headset, vitality data from wearable vitality trackers, et cetera. In some embodiments, the cohort experience orchestrator program 310A, 310B may continuously gather biometric data pertaining to one or more users, up to and including all users, at regular intervals. The cohort experience orchestrator program 310A, 310B may gather biometric data in real time or substantially real time.

At 604, the cohort experience orchestrator program 310A, 310B may determine a stress level of the user from biometric data. Stress analysis may be a method of determining the mental stress, or cognitive workload, affecting a user. In some embodiments, the cohort experience orchestrator program 310A, 310B may perform stress analysis on the biometric data to determine a mental state; a user may indicate a level of stress through their behavior and/or through involuntary physiological changes. For example, heart rate variations, breathing rate variations, blood pressure, skin hidrosis, diaphoresis, and pupil dilation may all indicate a level of cognitive workload experienced by the user. In some embodiments, the cohort experience orchestrator program 310A, 310B may continuously perform stress analysis on all users or a subset of users, at regular intervals.

The cohort experience orchestrator program 310A, 310B may perform stress analysis in real time or substantially real time.

At 606, the cohort experience orchestrator program 310A, 310B may determine a sentiment of the user based on analysis of the user's conversation. Sentiment analysis may be a method of inferring the current view or attitude of a user towards the mixed-reality experience or any of the virtual or physical elements comprising the mixed-reality experience. The cohort experience orchestrator program 310A, 310B may perform sentiment analysis by processing communications data pertaining to a user using text processing techniques such as entity and corpus linguistic methods and/or speech processing methods to determine the user's sentiment at any given moment during the user's participation in the mixed-reality experience; the cohort experience orchestrator program 310A, 310B may further attempt to determine whether the sentiment is directed towards the mixed-reality experience, and if so, what mixed-reality elements the sentiment is particularly directed to. In some embodiments, the cohort experience orchestrator program 310A, 310B may continuously perform sentiment analysis on all users or a subset of users, at regular intervals. The cohort experience orchestrator program 310A, 310B may perform sentiment analysis in real time or substantially real time.

At 608, the cohort experience orchestrator program 310A, 310B may determine a spatial context of the user based on one or more geolocation features. The spatial context may be information describing the position, orientation, and distance between physical objects, including individuals such as the user. Spatial context may be determined from spatial data which may be derived from an aggregation of geo location features available in the smart/wearable devices of users or other individuals within a threshold distance of a physical location of the mixed-reality experience, where geo location features may be software agents capable of deducing the geographical location of a device connected to the Internet, for example using the IP address, MAC address, et cetera. Spatial data may also include geolocation data gathered by sensors 308 such as global positioning systems, microlocation data gathered via near field communications, Bluetooth, RFID tags, beacons, et cetera, and any other location data gathered for instance via cameras and motion detectors, laser rangefinders, et cetera. In some embodiments, the cohort experience orchestrator program 310A, 310B may continuously gather spatial data pertaining to one or more users, up to and including all users, at regular intervals. The cohort experience orchestrator program 310A, 310B may gather spatial data in real time or substantially real time.

At 610, the cohort experience orchestrator program 310A, 310B may determine whether the user is in a queue line or immersed in the MR experience. In some embodiments, such as where the queue is a logical construct implemented on software, the cohort experience orchestrator program 310A, 310B may determine whether the user is in a queue by consulting the digital representation of the queue to determine whether the user is identified among the users within the queue; if the user is identified within the queue, the cohort experience orchestrator program 310A, 310B may conclude that the user is in the queue. In some embodiments, such as where the queue is physical, the cohort experience orchestrator program 310A, 310B may use the spatial data and image processing to identify whether the user is present in the physical location associated with the queue, and/or use biometric data to determine whether the user is exhibiting behaviors consistent with waiting, such as standing in a line of other users and/or standing still for long periods of time, et cetera. The cohort experience orchestrator program 310A, 310B may determine if the user is taking part in the MR experience by, for example, consulting the queue and/or past versions of the queue to determine if the user recently reached the first position in line before being taken off the queue, and/or use sensors 308 to identify the user as wearing a mixed-reality device 320, being physically present within the bounds delineated for the mixed-reality experience, et cetera. The cohort experience orchestrator program 310A, 310B may make this determination continuously at regular intervals, and may track the position of users relative to the queue or the MR experience in real time or substantially real time.

In some embodiments of the invention, determining whether the user is in a queue line or immersed in the MR experience may include a queue analysis to determine which individuals waiting to enter a mixed-reality experience should be considered users of a mixed-reality experience for the purposes of including the users within the co-evolution step of the cohort experience orchestration process. The co-evolution step may be a step where the cohort experience orchestrator program 310A, 310B uses the experiential state or alterations to the experience parameters of participants to facilitate communication with or alter the experiential state of users in the queue, or to attract individuals to join the queue and become users. The cohort experience orchestrator program 310A, 310B may identify individuals waiting to enter the mixed-reality experience as users based on the immediateness of the participant about to initiate the experience, and may perform initial categorization and user pre-classification based on historic experiences. The queue analysis may include pre-selection of a vehicle based on participant categorization affinity, or ca. This ca value is a contingency parameter needed when vehicles have limited or low intersecting configuration parameters. For example, one vehicle accepts X values between 20 and 60, and another vehicle accepts X values between 50 and 90. This value is important if pre-selecting in function of User Experience Coefficient (UXC) defined in the next step. The cohort experience orchestrator program 310A, 310B may determine a line break point beyond which individuals in the queue might be too far back to initiate in the experience. This returns a number h, which may represent the number of individuals within the line break point. The cohort experience orchestrator program 310A, 310B may calculate a critical mass coefficient k, which may be a dynamically calculated threshold indicating the minimum set of participants needed in a queue. k may calculate in function of vehicles available c, duration of the experience d, time for the participants to move in and out t, and the number of participants needed to maximize utilization of vehicle n. Possible values include:

$k=1$ critical mass
$k<1$ subcritical mass
$k>1$ supercritical mass

The outputs from the line analysis step may be ca, h, and k. These values may be used later when deriving the CUE-O and remediation models.

At 612, the cohort experience orchestrator program 310A, 310B may determine the experiential state of the user based on the biometric data, stress level, sentiment, and spatial context of the user, and whether the user is in a queue line or immersed in the MR experience. The experiential state of a user, herein also referred to as a User Experience Coefficient or UXC, may be a value quantifying the overall experience of the user within the context of the mixed-reality experience on a spectrum, where values towards one end of the spectrum represent unpleasant or poor user experiences, and values on the other end of the spectrum represent positive user experiences. The cohort experience orchestrator program 310A, 310B may calculate or continuously update the experiential state at regular time intervals throughout the user's time waiting in the queue or taking part in the mixed-reality experience, such that the cohort experience orchestrator program 310A, 310B may model the user's experiential state over time. The cohort experience orchestrator program 310A, 310B may calculate the experiential state based on a variety of information that may indicate the mental state of the user, and information that indicates the extent to which a given mental state of the user corresponds with a positive experience or a negative experience. Information that may indicate the mental state of the user may include, for example, biometric data of the user, spatial data of the user, stress analysis of the user, sentiment analysis of the user, et cetera. Information that indicates an extent to which a given mental state of the user corresponds with positive or negative experiences may include crowdsourced or historical data, user feedback, machine learning, user preferences, et cetera. The cohort experience orchestrator program 310A, 310B may calculate two different experiential states; one experiential state calculated from data gathered when the user was in the queue, and one experiential state calculated from data gathered while the user was taking part in the MR experience. In some embodiments, the cohort experience orchestrator program 310A, 310B may annotate gathered data indicating whether the data was gathered while the user was in the queue or the MR experience.

At 614, the cohort experience orchestrator program 310A, 310B may compare the experiential state of the user against experiential states associated with compatible previous MR experiences. Here, the cohort experience orchestrator program 310A, 310B may create a UXC temporal variation index, where the current UXC is compared against previous compatible experiences and a UXC variation index is also annotated. Mixed-reality experiences may be compatible when they share characteristics such as intensity, character, et cetera. For example, experiences in a carousel and a teacup ride might be compatible, but experiences in a rollercoaster may not be compatible. The temporal variation index may be intended to provide a way to monitor how the UXC may vary over time while the user is engaged in an activity. This temporal variation index would apply to similar scenarios, such as scenarios where the user is waiting in a queue, or repeatedly entering the same MR experience back-to-back. The cohort experience orchestrator program 310A, 310B may monitor see and annotate the variations in the user experience during similar activities and use this information to decide whether to make any adjustments to the UXD.

At 616, the cohort experience orchestrator program 310A, 310B may map spikes in the experiential state of the user to corresponding parameters of the MR experience. In some embodiments of the invention, the cohort experience orchestrator program 310A, 310B may create a model to provide a mapping between spikes, or salient features of the user's experiential state over time, and experience parameters to which they correspond. This model may be referred to as the experience enhancing drivers model, or UXD. The cohort experience orchestrator program 310A, 310B may use the UXD to identify one or more salient features by consulting the UXC over time and identifying regions where the UXC exceeded an upper threshold or fell below a lower threshold, where for example the upper threshold represents a value of the experiential state above which the experiential state can be considered to represent a positive experience, and the lower threshold indicates a value of the UXC below which the UXC can be considered to represent a negative experience. The cohort experience orchestrator program 310A, 310B may employ additional thresholds, and the thresholds may be established or adjusted, for example, based on machine learning or user feedback. The cohort experience orchestrator program 310A, 310B may be pre-provided with experience parameter information, which may include a list of all experience parameters present and/or controllable by the cohort experience orchestrator program 310A, 310B, and may include contextual information regarding experience parameters that may be helpful in determining whether and when a user encountered a given experience parameter. For example, the contextual information may include the location of experience parameters that are bound to a location, or the location of experience parameters that are mobile (train, virtual creature) at regular intervals. For more abstract experience parameters, such as motion, visual or audio effects, traits such as speed or acceleration, et cetera, the contextual information may include the times at which the effects or conditions were present and/or the users or area affected by the effects or conditions. The cohort experience orchestrator program 310A, 310B may compare the time intervals corresponding with the salient features to the user's location during those time intervals. The cohort experience orchestrator program 310A, 310B may determine what experience parameters were visible to the user, producing an effect on the user, or otherwise present in the vicinity of the user such that the experience parameter may have contributed to the salient feature of the user's UXC, and may mark such experience parameters as potential experience parameters. For example, the cohort experience orchestrator program 310A, 310B may use cameras to identify where the user was looking, and may identify all visible experience parameters in that direction as potential experience parameters. In some embodiments of the invention, the UXD outputs all potential experience parameters associated with the salient features. In some embodiments the cohort experience orchestrator program 310A, 310B may use machine learning methods to identify a likelihood that any given potential experience parameters contributed to or caused the salient feature in the user's UXC based on patterns previously identified; for example, the cohort experience orchestrator program 310A, 310B may determine a likelihood based on whether the same type of experience parameters produced a similar effect on the experiential state of similar users in the past, whether the same type of experience parameters produced a similar effect on the experiential state of the same user in the past, et cetera.

At 618, the process identifies cohorts and associated parameters using aggregated modeling and analysis results. In some embodiments, the process accepts the UXC, the UXD, and the line analysis data as inputs. In some embodiments, the process identifies cohorts of users and associated parameters using aggregated modeling and analysis results from current and past user experiences. For example, in some embodiments, the process derives an HCP model based on UXD, UXC, and line analysis data, resulting in a model that represents a relationship between the different parameters of the experience that translate to specific stimuli and how the user responds to them. This and other HCP models are aggregated and analyzed to identify ideal participant clustering for maximizing the experience as a cohort for a common set of UXDs. In some embodiments, the process analyzes the runtime parameters (stimuli) from the UXD 422 and the individual responses from the UXC 420 to identify patterns and create clusters associating runtime parameters with user responses. In some such embodiments, the process deconstructs and generalizes the identified patterns into simplified, comparable elements. In some such embodiments, for simplicity, the process uses the same elements used for the UXC 420 model, for example communication patterns, runtime patterns, biometric patterns, relative stress patterns, and/or sentiment patterns.

In some embodiments, the process identifies user cohorts and associated parameters using a quantitative analysis that takes an unbiased/emergent approach to the analysis. In some such embodiments, the process performs both a training phase and a clustering phase, both of which include computerized feature extraction to generate a set of parameters for each cohort. In an embodiment, each cohort represents a group of users for whom a particular intensity level is associated with an optimal experience. As a non-limiting example, a particular park attraction that involves motion that applies different amounts of G-forces to different cohorts, where the passengers are grouped into the cohorts according to preferred intensity levels; for a first cohort of users who prefer low-intensity experiences, G-forces applied to ride passengers is capped at a first value; for a second cohort of users who prefer moderate-intensity experiences, G-forces applied to ride passengers is capped at a second value (higher than the first cap value used for the first (low-intensity) cohort); and for a third cohort of users who prefer high-intensity experiences, G-forces applied to ride passengers is capped at a third value (higher than the second cap value used for the second (moderate-intensity) cohort). Actual implementations may involve additional/alternative parameters, and may divide riders into any number of cohorts of varying preferences.

In an embodiment, the resulting sets of parameters provide optimal user experiences for each cohort. Utilization of the UXC data enables quantitative characterization of the overall user population present within the experience or queued for the experience. Both the training phase and the clustering phase include a statistical hierarchical agglomerative clustering technique (described in greater detail in connection with FIG. 5) to classify users by quantitative reactions to applied stimuli. The clustering analysis categorizes the users into different groups or cohorts based on similarities between the user reactions to certain stimuli. For example, for a given stimulus applied to each user, such as a jump-scare effect, a first group may react with disapproval, discomfort, or dislike, whereas another group of users may react almost unphased by the same stimulus. In an embodiment, hierarchical agglomerative clustering is used for both training the model and utilizing the trained HCP model for determining intensity preferences of unknown users. In an exemplary embodiment, identifying information for the users is not collected or is masked during training phases to prevent encoding bias.

In some embodiments, hierarchical agglomerative clustering incorporates measures related to cognitive perception and proprioception to maximize performance of a user experience. The resulting experience analysis and performance prediction determines the response of basic cognitive performance indicators that support and alter different levels of experience performance in a cohort. Such embodiments determine a cognitive workload profile and the subsequent computation of a single number measure of cognitive workload. The use of this method will perform dynamic and micro-based adjustments to crucial attributes of a user experience and arrive at a single adjustment tailored to a cohort. In some embodiments, the process includes a machine learning discriminator capabilities that use historical user responses to predict the probability of various experience enhancement driver values being optimal. In some embodiments, user responses are measured from both users participating in the experience and users waiting in line to participate, and communication between the two groups.

At 620, the cohort experience orchestrator program 310A, 310B may trigger one or more remedial actions based on the modeled relationships. In some embodiments of the invention, the cohort experience orchestrator program 310A, 310B may execute remedial actions to implement the predicted changes to the mixed-reality experience. The remedial actions may be any actions that serve to carry out the predicted changes to the experience parameters. The cohort experience orchestrator program 310A, 310B may electronically interface with mechanical and software components of the mixed-reality experience such that the cohort experience orchestrator program 310A, 310B may send commands to execute the changes in both hardware and software environments. In some embodiments to the invention, alterations to grouped experience parameters may be executed simultaneously. In embodiments where changes to an experience parameter would affect multiple participants, the cohort experience orchestrator program 310A, 310B may only make the changes where the cohort experience orchestrator program 310A, 310B predicts that the changes would have a neutral or positive effect on the experiential state of all affected participants. In some embodiments, for example where queue analysis determines that the number of users in the queue is below a desired number, the cohort experience orchestrator program 310A, 310B may communicate with nearby individuals with compatible experiential states to join the queue, for example utilizing synthesized or recorded speech through speakers, messages to the user's mobile device, via displays, augmented reality graphical elements, et cetera.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A processor-implemented method comprising:
determining an experiential state of a first user participating in a mixed-reality experience;
creating a first driver model that maps a relationship between the experiential state of the first user and a parameter of the mixed-reality experience;
aggregating the first driver model with a plurality of driver models associated with experiential states and parameters of respective other users;
creating a first cohort experience model using the aggregated driver models;
deriving a first cohort experience parameter for the first cohort experience model; and
initiating an automated remedial action for participants in the mixed-reality system being associated with the first cohort experience model and the first cohort experience parameter.

2. The method of claim 1, further comprising:
creating a second cohort experience model using the aggregated driver models; and
deriving a second cohort experience parameter for the second cohort experience model.

3. The method of claim 2, wherein the first cohort experience parameter causes a stimulus of the mixed-reality experience to operate at a first intensity level; and
wherein the second cohort experience parameter causes the stimulus of the mixed-reality experience to operate at a second intensity level different from the first intensity level.

4. The method of claim 1, wherein the automated remedial action comprises communicating with the first user based on the experiential state of the first user.

5. The method of claim 1, wherein the experiential state of the first user is further based on the first user being in a queue for the mixed-reality experience.

6. The method of claim 1, wherein the creating of the first cohort experience model comprises arranging the first user and the plurality of other users using agglomerative clustering.

7. The method of claim 1, further comprising:
determining the experiential state of a first user participating in a mixed-reality experience.

8. A computer program product comprising one or more computer readable storage media, and program instructions collectively stored on the one or more computer readable storage media, the program instructions executable by a processor to cause the processor to perform operations comprising:
determining an experiential state of a first user participating in a mixed-reality experience;
creating a first driver model that maps a relationship between the experiential state of the first user and a parameter of the mixed-reality experience;

aggregating the first driver model with a plurality of driver models associated with experiential states and parameters of respective other users;

creating a first cohort experience model using the aggregated driver models;

deriving a first cohort experience parameter for the first cohort experience model; and initiating an automated remedial action for participants in the mixed-reality system being associated with the first cohort experience model and the first cohort experience parameter.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

11. The computer program product of claim 8, further comprising:

creating a second cohort experience model using the aggregated driver models; and deriving a second cohort experience parameter for the second cohort experience model.

12. The computer program product of claim 11, wherein the first cohort experience parameter causes a stimulus of the mixed-reality experience to operate at a first intensity level; and wherein the second cohort experience parameter causes the stimulus of the mixed-reality experience to operate at a second intensity level different from the first intensity level.

13. The computer program product of claim 8, wherein the automated remedial action comprises communicating with the first user based on the experiential state of the first user.

14. The computer program product of claim 8, wherein the experiential state of the first user is further based on the first user being in a queue for the mixed-reality experience.

15. The computer program product of claim 8, wherein the creating of the first cohort experience model comprises arranging the first user and the plurality of other users using agglomerative clustering.

16. The computer program product of claim 8, further comprising:

determining the experiential state of a first user participating in a mixed-reality experience.

17. A computer system comprising a processor and one or more computer readable storage media, and program instructions collectively stored on the one or more computer readable storage media, the program instructions executable by the processor to cause the processor to perform operations comprising:

determining an experiential state of a first user participating in a mixed-reality experience;

creating a first driver model that maps a relationship between the experiential state of the first user and a parameter of the mixed-reality experience;

aggregating the first driver model with a plurality of driver models associated with experiential states and parameters of respective other users;

creating a first cohort experience model using the aggregated driver models;

deriving a first cohort experience parameter for the first cohort experience model; and initiating an automated remedial action for participants in the mixed-reality system being associated with the first cohort experience model and the first cohort experience parameter.

18. The computer system of claim 17, further comprising:

creating a second cohort experience model using the aggregated driver models; and deriving a second cohort experience parameter for the second cohort experience model.

19. The computer system of claim 17, further wherein the first cohort experience parameter causes a stimulus of the mixed-reality experience to operate at a first intensity level; and wherein the second cohort experience parameter causes the stimulus of the mixed-reality experience to operate at a second intensity level different from the first intensity level.

20. The computer system of claim 17, further wherein the automated remedial action comprises communicating with the first user based on the experiential state of the first user.

* * * * *